Dec. 9, 1941.  O. SIME  2,265,702
CASEIN SPREADER
Filed July 2, 1940  3 Sheets-Sheet 1
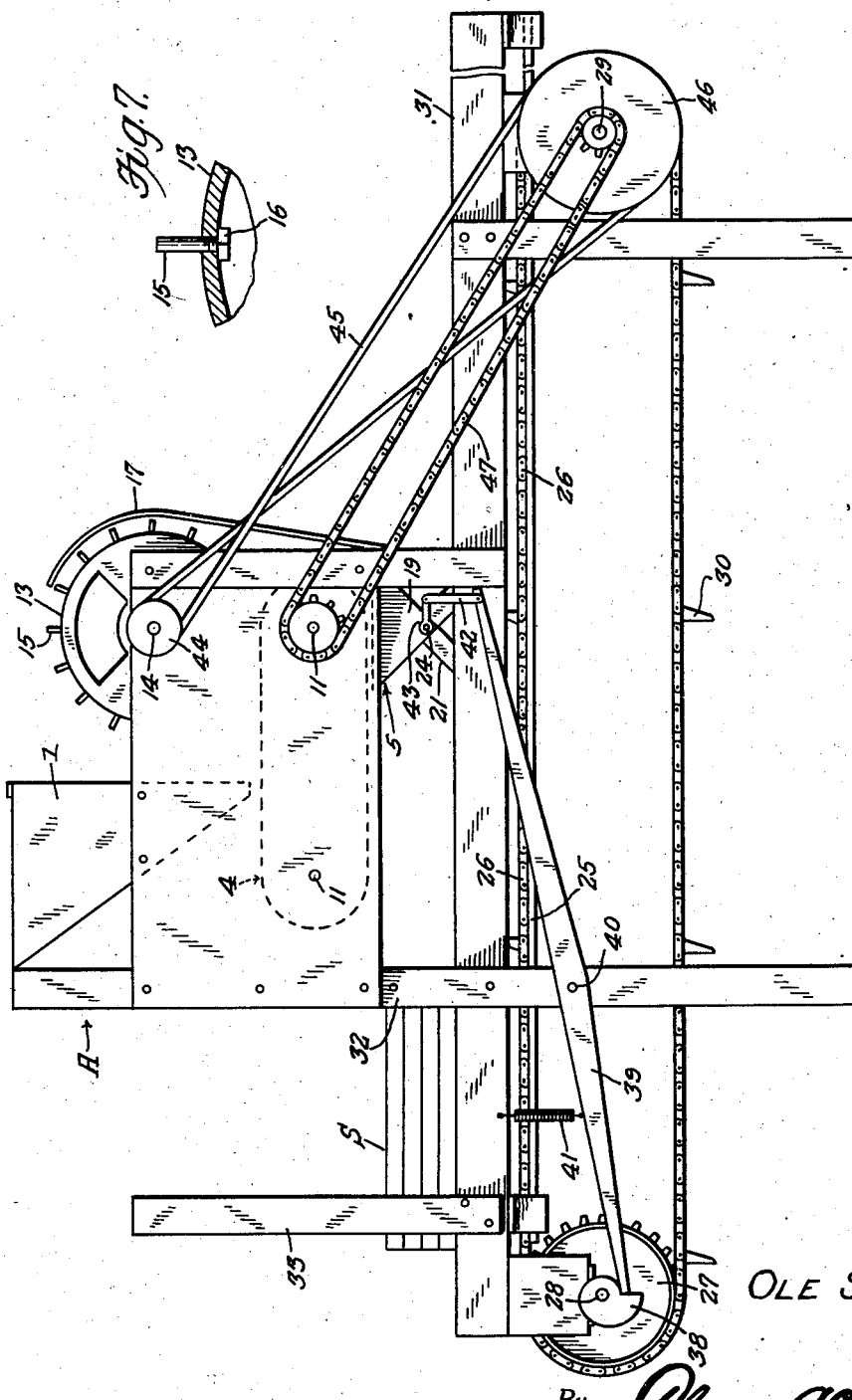
Inventor
OLE SIME
By *Clarence A. O'Brien*
Attorneys Dec. 9, 1941.   O. SIME   2,265,702
CASEIN SPREADER
Filed July 2, 1940   3 Sheets-Sheet 2
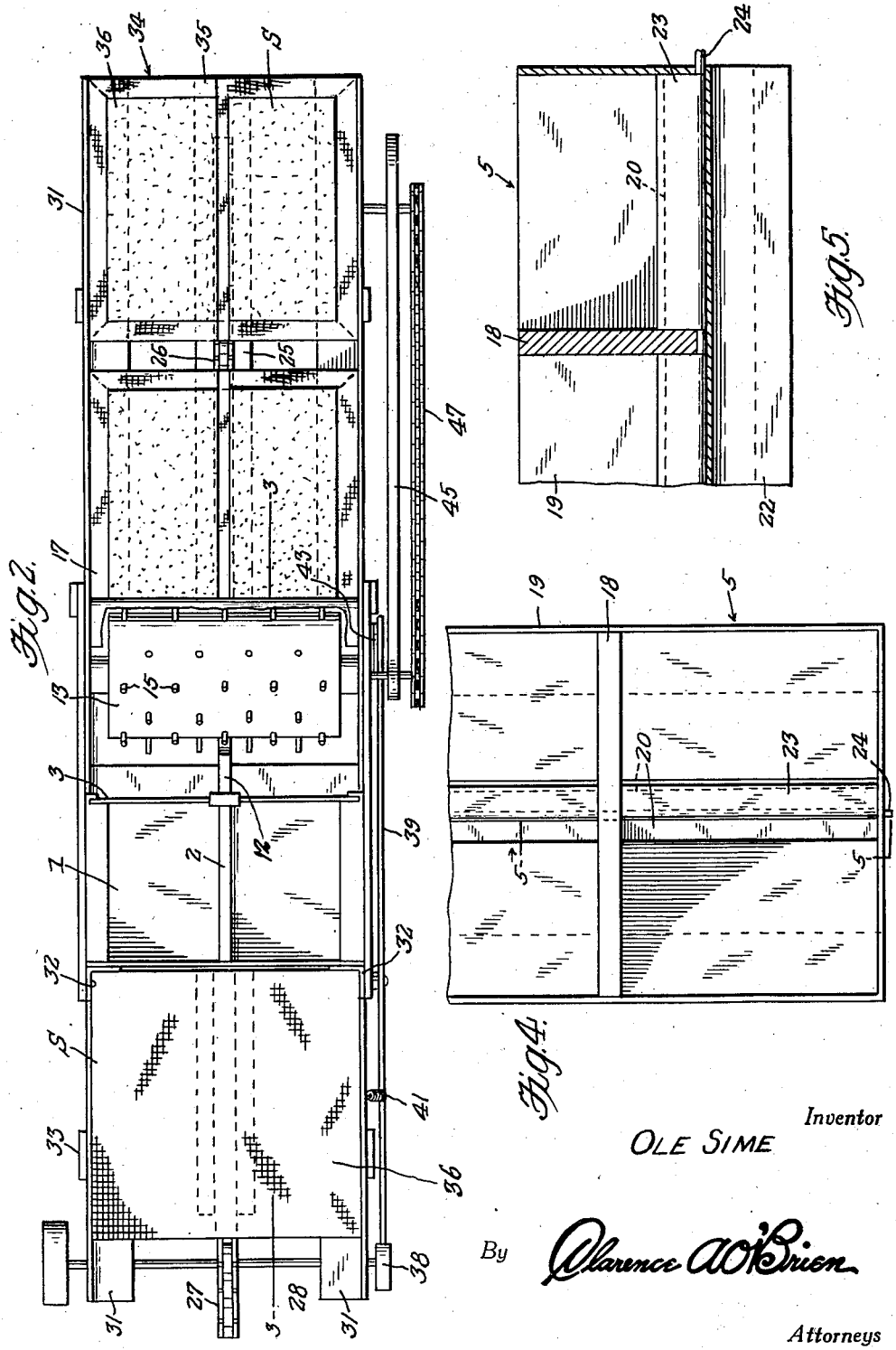
Inventor
OLE SIME
By *Clarence A. O'Brien*
Attorneys Dec. 9, 1941.  O. SIME  2,265,702
CASEIN SPREADER
Filed July 2, 1940   3 Sheets—Sheet 3
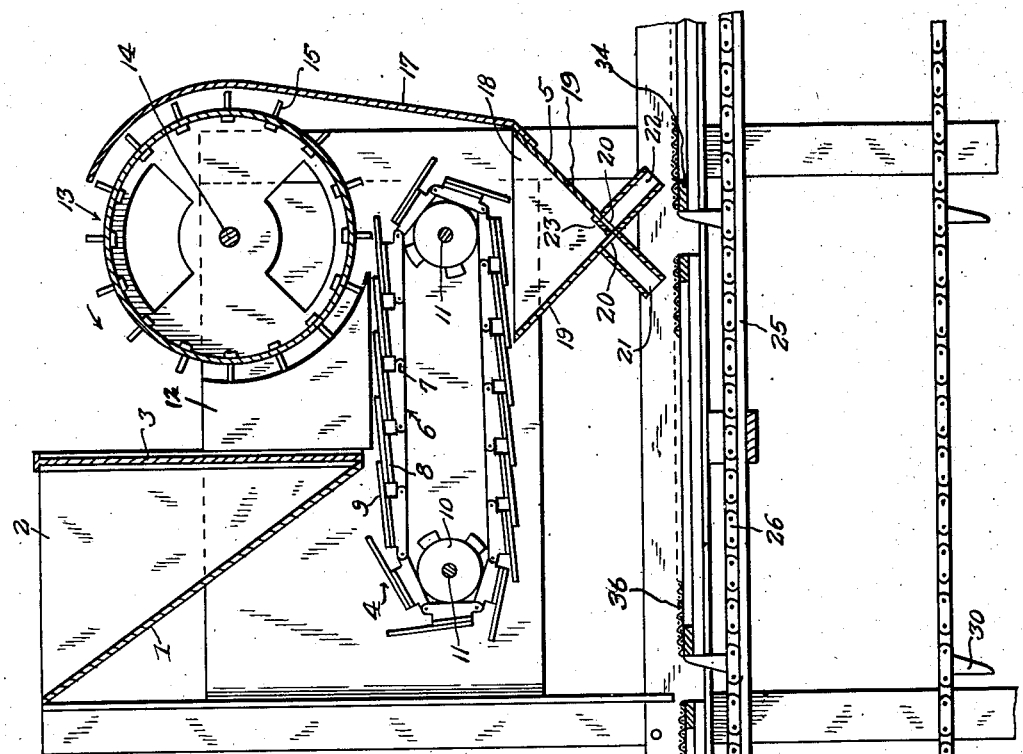
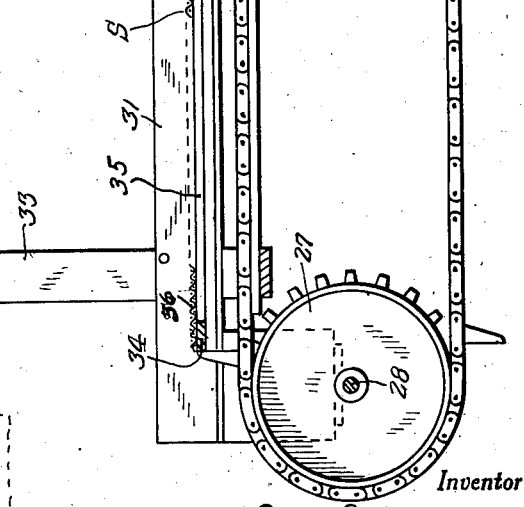
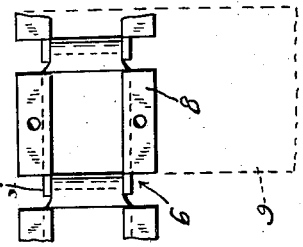
Inventor
OLE SIME
By *Clarence A. O'Brien*
Attorneys Patented Dec. 9, 1941

2,265,702

UNITED STATES PATENT OFFICE 2,265,702

CASEIN SPREADER

Ole Sime, Cadott, Wis.

Application July 2, 1940, Serial No. 343,662

5 Claims. (Cl. 91—43)

This invention relates to a casein spreader, the general object of the invention is to provide means for spreading casein on screens quickly and easily so as to save time and labor as well as material.

Another object of the invention is to provide means whereby the casein can be properly placed on screens as now made and which have a dividing strip at the centers, the apparatus placing the casein on each screen and to each side of the dividing strip and inwardly of the sides and ends of the frame so the casein is only placed on that part of the screen which covers the opening in the frame thus permitting the air to contact all parts of the casein.

Another object of the invention is to move the screens by an endless chain device with the device moving the screens with spaces between them and to provide delivery means whereby the casein is evenly supplied to the screens but not into the spaces between the screens.

This invention also consists in certain other features of construction and in the combination and arrangement of the several parts to be hereinafter fully described.

In describing the invention in detail, reference will be had to the accompanying drawings wherein like characters denote like or corresponding parts throughout the several views, and in which:

Figure 1 is an elevational view of the apparatus.

Figure 2 is a top plan view thereof.

Figure 3 is a section on the line 3—3 of Figure 2.

Figure 4 is a fragmentary top plan view of the spreader hopper.

Figure 5 is a section on the line 5—5 of Figure 4.

Figure 6 is a view of one of the links of the endless chain for conveying the casein from the main hopper to the spreader hopper.

Figure 7 is a fragmentary sectional view showing how a tooth is supported in the drum.

In these views the letter A indicates an upright supporting frame and the numeral 1 indicates the main or delivery hopper which is supported at the top of the frame and which is divided into two chambers by a central partition 2. A vertically slidable door 3 controls the discharge of the casein from the two chambers and such material falls upon an endless conveyor 4 which delivers the material into the spreader hopper 5. The conveyor 4 is formed of a plurality of links 6, see Figure 6, these links being pivotally connected together as shown at 7 and each link has its side members extended and then bent over to form the flanges 8. Elongated plates 9, each has one end connected to the flanges 8 of the link of one chain and its other end to the flanges 8 of the link of the other chain. Each plate 9 has a forward extension which will overlap the rear part of the next plate as shown in Figure 3. The endless chains are supported by the sprockets 10 on the front and rear shafts 11 journaled in the frame.

A block 12 is suitably supported in the frame over the conveyor 4 and extends forwardly from the front of the hopper 2 and forms a continuation of the partition 2 so that the material delivered onto the conveyor from the two chambers of the hopper will remain separated by this block.

A drum 13 is supported on a shaft 14 journaled in the frame and said drum is provided with a plurality of teeth 15, each of which is preferably threaded into a hole in the circumference of the drum and held in position by a nut 16 as shown in Figure 7. The rear edge of the block 12 is of arcuate shape to permit the centrally arranged teeth to pass and these teeth will engage the material on the rear end of the conveyor 4 and these teeth are arranged in rows with the teeth of each row staggered with respect to the teeth of the adjacent rows and a sufficient number of these teeth should be used so that after four rows of teeth have passed the casein on the conveyor the teeth in the four rows have touched substantially all the material the width of the conveyor. These teeth will work up the casein on the conveyor, breaking up lumps and preventing any lumps from dropping into the hopper 5.

A guard 17 extends upwardly from the rear part of the hopper 5 and is spaced from the rear end of the conveyor 4 and covers the rear part of the drum, as shown in Figure 3, this guard preventing waste of material which might be thrown off by the moving parts, the guard catching said material and delivering it into the hopper 5. As will be seen from the arrow the drum rotates in anti-clockwise direction.

Of course, the casein drops off the conveyor 4 into the hopper 5 and this hopper is also divided into two chambers by a partition 18. The hopper is composed of two downwardly converging side walls 19 and each side wall has an outlet slot 20 in its bottom, there being an outlet slot for each chamber, and a chute 21 extends downwardly and forwardly from the front wall 19 while a similar chute 22 extends downwardly and rearwardly from the rear wall 19. A flap valve 23 formed in two sections to control the flow of casein from both chambers of the hopper 5, is pivotally arranged in the bottom of the hopper 5 as shown at 24 and this valve is so formed that in one position it will close the outlets leading to the chute 22 and in another position will close the outlets leading to the chute 21 and in either position the other outlets will be open.

A horizontal table 25 is supported by a lower part of the frame and the upper reach of an endless chain 26 runs over this table, the chain being supported by the sprockets 27 carried by the shafts 28 and 29 and some of the links of this chain carry the projections 30.

A pair of angle iron beams 31 is supported in horizontal position at the lower part of the frame and above the upper reach of the chain 26 and these beams form slides or tracks for the screens S and these screens are engaged by the projections 30 which move the screens along the tracks in spaced relation. A hopper H is formed at the front end of the frame for the screens, the hopper being composed of the front pair of angle beams 32 which engage the front corners of the screens and the upright pieces 33 which engage the side edges of the screens. Hopper 5 is of a length equal to the width of the space formed by the side members of the screen frame.

As will be seen each screen is composed of a frame 34 which includes a central piece 35 and the screen 36 is fastened to this frame and by making the hopper 5 of the length specified and dividing the hopper into pairs of chambers and separating the material coming from such chambers no casein will be placed on the side edges or on the central part of the screen 36 over the central member 35. This is desirable as, of course, the central member 35 and the side members will interfere with the drying of the casein placed on the screen above them.

The shaft 28, which may be the driven shaft, carries a cam 38 for operating a lever 39 pivoted to a part of the frame as at 40 and held with its front end in engagement with the cam by a spring 41. A link 42 connects the rear end of the lever 39 with an arm 43 on one of the pintles 24 of the valve 23 of the hopper 5 so that this valve 23 is shifted from one position to the other by the cam 38 and the lever 39.

As will be seen the cam 38 moves with the sprocket 27 which actuates the screen feeding chain 26 and this cam is so formed and arranged relative to the screen feeding means that when the rear end of a screen is approaching the chute 22 of hopper 5, the lower part of the cam will have moved under the front end of lever 39 so that the spring 41 will move said lever and this will cause the valve 23 to snap to closed position closing the chute 22. The chute 21 will be open but with the parts in the position shown in Figure 3 the next screen will have its front portion in position ready to receive the material from the chute 21. Then during the movement of the parts the rotary movement of the cam 38 will cause the lever 39 to slowly open the valve 23 so that the material from the hopper 5 will be discharging through both chutes onto the screen but before the rear end of this screen reaches the chute 21 the cam 38 has caused the lever 39 to move the valve 23 to the position closing the chute 21 so that no material can pass from the chute 21 into the space between two of the screens. Then just before the rear end of the screen reaches the other chute 22 the front end of the lever passes off the high end of the cam and this causes the valve 23 to close the chute 22 so that no material can pass from this chute 22 into the space between two of the screens.

A pulley 44 is placed on one end of the shaft 14 of the drum 13 and a belt 45 passes over the pulley 44 and over a pulley 46 on the shaft 29 so that the drum is driven from the shaft 29 and chain and sprocket means shown generally at 47 connect the shaft 29 with the rear shaft 11 of the conveyor 4.

Thus it will be seen that the casein is placed in the two chambers of the hopper 1 and the door regulated to permit the casein to flow therefrom upon the conveyor 4. The teeth of the drum 13 engage the casein on the conveyor to break up the lumps and the casein is delivered into the two chambers of the hopper 5 from which it passes onto the screens S from the chutes 21 and 22. As before stated the gate or valve 23 is so actuated that when a space between two of the screens approaches a chute the valve is closed so that the chute will not deliver casein into the space between the two screens, but the chutes will evenly distribute the casein to the screens and to the two parts of each screen without placing the casein on the central portion under which the member 35 is located nor on those parts of the screen covering the end members of the frame.

This device will evenly distribute the casein to the screens so that the casein will be of substantially the same thickness on the screens and the casein will be placed on that part of the screen which only covers the opening in the frame which enables the casein to be quickly dried and the handling of the casein by this machine not only saves time and labor but it also saves wear on the screens, requires less fuel and the drying operation is greatly quickened.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. A casein handling apparatus comprising a hopper divided into two chambers, gate means for controlling the flow of material from the chambers, a second hopper divided into two chambers, conveying means for conveying the material from the first hopper into the second hopper, means for keeping separated the material on the conveying means delivered thereonto from the two chambers of the first hopper, a toothed drum, the teeth of which operate on the material on the rear end of the conveyor, a track extending horizontally and passing under the second hopper, said track adapted to receive screen covered frames thereon, an endless member having projections thereon for moving the screens along the track, the second hopper having two sets of delivery chutes, one extending downwardly and forwardly and the other set extending downwardly and rearwardly, a pivoted valve for controlling the flow of material from the chambers of the second hopper into said sets of chutes and means for automatically moving the valve to control the flow of material through the chutes to prevent material from passing through a chute when the same is over a space between two of the screen frames or over the end members of the screen frames.

2. An apparatus of the class described comprising an upright frame, a hopper divided into two chambers supported at the top part of the frame, gate means for controlling the flow of material from the chambers, conveying means receiving the material passing from the hopper, a second hopper divided into two chambers receiving the material from the conveying means, a toothed drum the teeth of which operate upon the material at the rear end of the conveying means, a block located over the conveying means for keeping the material delivered thereon from the two chambers separated, two sets of chutes extending from the second hopper, one set extending downwardly and forwardly and the other extending downwardly and rearwardly, a flap valve for controlling the flow of material into the chutes, a track extending horizontally and having a portion passing under the chutes, a hopper for receiving a stack of screen covered frames for delivering the frames on the track, an endless member having projections thereon for moving the screen covered frames along the track, supporting means for the endless member, said supporting means including front and rear shafts, means for operating the drum from the rear shaft, means for operating the first-mentioned conveyor from the rear shaft, a cam on the front shaft, a lever pivoted to the frame and having one end engaged by the cam, spring means for holding the lever in engagement with the cam and means actuated by the lever for operating the flap valve to prevent discharge of material from the spouts into spaces between the screen frames.

3. In an apparatus for spreading material upon screened covered frames, a hopper for receiving the material to be spread, downwardly diverging chutes leading from the hopper, a horizontal track extending under the chutes and slidably supporting the screen covered frames, means for moving the frames along the track and under the hopper, valve means for controlling the flow of material through the chutes and means actuated from the frame moving means for actuating the valve means to cause the same to close that chute under which the rear end of a frame is passing and at the same time to open the other chute to cause material to feed upon the next following frame.

4. In a material spreading apparatus, a hopper for receiving the material to be spread, downwardly diverging chutes in communication with the lower end of the hopper, a flap valve in the lower end of the hopper for controlling the flow of material through both chutes, a horizontal track extending under the hopper, a second hopper for receiving screen covered frames, an endless conveyor having lugs thereon for moving frames from the second hopper under the first hopper, means for actuating the conveyor, a cam connected with the actuating means of the conveyor, a lever actuated by the cam and means for connecting the lever to the valve for actuating the valve to close that chute under which the rear end of one frame is passing while opening the other chute to permit material to pass upon the following frame.

5. In an apparatus for spreading material upon frames, a hopper for containing the material, a conveyor for moving the frames under the hopper, a pair of downwardly diverging chutes connected with the hopper, one chute extending in the direction of movement of the conveyor and the other in an opposite direction, valve means for controlling the flow of material through the chutes and means actuated by the conveyor for actuating the valve means to close the forwardly extending chute as the rear end of a frame is passing under the same and at the same time open the other chute to cause material to pass upon the front end of the next following frame, such valve means opening both chutes as the major portion of a frame is passing under the chutes.

OLE SIME.